United States Patent [19]

Okino et al.

[11] 4,323,598

[45] Apr. 6, 1982

[54] METHOD OF COATING GLASS SURFACE WITH HEAT-REFLECTING METAL OXIDE FILM

[75] Inventors: Seiki Okino; Toshiharu Yanai; Katsuto Tanaka, all of Matsusaka, Japan

[73] Assignee: Nissan Motor Co., Ltd., Yokohama, Japan

[21] Appl. No.: 216,752

[22] Filed: Dec. 15, 1980

[30] Foreign Application Priority Data

Dec. 28, 1979 [JP] Japan ............................... 54-170462

[51] Int. Cl.$^3$ .......................... C03C 17/25; G02B 1/10
[52] U.S. Cl. ................................. 427/160; 65/60.52; 427/168
[58] Field of Search ................ 427/160, 168; 65/60.52

[56] References Cited

U.S. PATENT DOCUMENTS 4,160,061 7/1979 Okino et al. ................ 427/160 X
4,232,062 11/1980 Okino et al. ...................... 427/160

Primary Examiner—James R. Hoffman
Attorney, Agent, or Firm—Fleit & Jacobson

[57] ABSTRACT

An improvement in a method of coating a glass plate surface with a heat-reflecting titanium oxide film, which may optionally comprise other metal oxide(s), by spraying a solution of a thermally decomposable organic titanium compound in an organic solvent onto a sufficiently heated glass plate. As the improvement, the absolute humidity of the spraying atmosphere is maintained below about 0.008 kg $H_2O$/kg dry gas, whereby the resultant oxide film is practically free from tiny, opaque spots which are liable to appear in the product of conventional methods and exhibits improved resistance to chemical attacks.

6 Claims, No Drawings

METHOD OF COATING GLASS SURFACE WITH HEAT-REFLECTING METAL OXIDE FILM

BACKGROUND OF THE INVENTION

This invention relates to the production of a heat-reflecting glass plate, and more particularly to a method of coating a glass plate surface with a heat-reflecting metal oxide film by spraying a solution of a thermally decomposable organic metal compound onto a heated glass surface to thereby cause thermal decomposition of the metal compound to metal oxide.

A popular method of producing a heat-reflecting glass plate is to coat one side of a glass plate with a heat-reflecting metal oxide film by spraying a solution containing a thermally decomposable organic metal compound dissolved in an organic solvent onto a heated glass surface to thereby cause thermal decomposition of the organic metal compound to metal oxide. Titanium oxide $TiO_2$ is one of metal oxides known as suitable for this purpose, and the present invention is particularly concerned with the formation of a titanium oxide film, or a metal oxide film of which the principal component is titanium oxide, on a glass plate surface by the above-mentioned spraying method.

The above-mentioned spraying method is quite favorable for industrial production of a heat-reflecting glass plate. However, when a titanium oxide film is formed on a glass plate surface by this method, the titanium oxide film is liable to have a countless number of opaque spots each as small as 5 to 20 microns in diameter. The existence of such spots renders the titanium oxide film cloudy and, hence, significantly injures the appearance of the film. Moreover, the strength of adhesion of the titanium oxide film to the glass surface becomes weaker in the areas of the respective spots, so that the titanium oxide film having such spots becomes inferior to a uniform and defectless titanium oxide film also in durability and particularly resistance to chemical attacks.

This problem has already been recognized, and it has been tried to solve this problem by, for example, using a special solvent and/or a certain additive, but until now a fully effective measure has not yet been found.

SUMMARY OF THE INVENTION

It is an object of the present invention to provide an improved method of coating a glass plate surface with a heat-reflecting metal oxide film which comprises titanium oxide as a principal component thereof, by which method the metal oxide film can be formed with practically no defects such as the aforementioned opaque spots and accordingly afforded with an excellent appearance and improved durability.

The present invention is based on our discovery that a primary cause for the appearance of tiny, opaque spots in a titanium oxide film formed on a glass surface by the conventional solution-spraying method is the presence of an unnegligible amount of moisture in the spraying atmosphere, that is, an atmosphere constituted of air present in the spraying chamber, compressed air used to spray the solution and the droplets of the sprayed solution. We have confirmed that, under conventionally employed spraying conditions in the solution-spraying method for coating of a glass plate surface with a titanium oxide film, the moisture contained in the spraying atmosphere amounts to 0.01 to 0.1 in terms of absolute humidity (kg $H_2O$/kg dry air).

Because of the existence of such an amount of moisture in the spraying atmosphere, which is a hot atmosphere at least in a region near the heated glass plate, a portion of the sprayed organic titanium compound undergoes hydrolysis before its arrival at the surface of the heated glass plate, and the hydrolyzed portion of the organic titanium compound polymerizes to form sticky and relatively large-sized particles. Where the heated glass plate is sprayed with a mist containing the sticky and large-sized particles formed by such a hydrolysis-polymerization process, it is inevitable that the titanium oxide film formed on the glass surface has a very large number of opaque spots and therefore becomes unsatisfactory in both the appearance and durability.

Further, we have discovered that a defectless titanium oxide film can be formed with good reproducibility by strictly controlling the amount of moisture in the spraying atmosphere in the mentioned solution-spraying method.

The present invention provides a method of coating a glass plate surface with a heat-reflecting metal oxide film which comprises titanium oxide as a principal component thereof, which method has the known step of spraying a solution containing a thermally decomposable organic titanium compound dissolved in an organic solvent onto a surface of a glass plate which has been heated such that the glass surface is maintained at a temperature sufficient to cause thermal decomposition of the organic titanium compound to titanium oxide. The improvement according to the invention resides in that the spraying step is performed by maintaining the absolute humidity of the spraying atmosphere below about 0.008 kg $H_2O$/kg dry gas.

As can be understood from the above statement, a heat-reflecting metal oxide film to be formed by the method according to the invention is not limited to a practically pure titanium oxide film but may alternatively be a metal oxide film which comprises titanium oxide as its principal component and, in addition, at least one other metal oxide such as the oxide or oxides of cobalt, chromium, iron, nickel, tin, manganese, aluminum, indium, zinc, silicon and/or arsenic. In the latter case, the solution to be sprayed is made to contain not only an organic titanium compound but also conventionally utilized organic metal compound(s) as the material(s) for the additional metal oxide(s), all dissolved in the solvent.

DESCRIPTION OF THE PREFERRED EMBODIMENTS

The improvement according to the invention does not affect the possibility of selecting a compound from a wide variety of thermally decomposable organic titanium compounds in the conventional solution-spraying method. Some examples of organic titanium compounds useful in the method according to the invention are alkyl titanates such as tetraethyltitanate, tetrapropyltitanate, tetraisobutyltitanate, tetra-sec-butyltitanate, tetra-tert-butyltitanate, tetra-n-pentyltitanate and tetra-i-pentyltitanate; titanium acylates such as hydroxytitanium stearate, isopropoxytitanium stearate and isopropoxytitanium isoacylate; and chelated titanium compounds such as titanium ethyleneglycolate, 1,3-butanediol titanate, hexyleneglycol titanate, titanium acetylacetonate, methylacetoacetate titanium, ethylacetoacetate titanium, triethanolamine titanium and titanium diisopropoxy-monooctyleneglycoxy monoacetylacetonate.

To prepare a solution of the selected organic titanium compound, it is suitable to utilize an organic solvent that does not contain water by selecting one or two from, for example, hydrocarbons, halogenated hydrocarbons, alcohols, ethers, ketones and esters.

As specified hereinbefore, the solution-spraying operation in a method according to the invention is performed by maintaining the absolute humidity of the spraying atmosphere below about 0.008 kg $H_2O$/kg dry gas. If the absolute humidity of the spraying atmosphere becomes about 0.009 kg $H_2O$/kg dry air or above, the result is the formation of a titanium oxide coating film having a considerable number of opaque spots which render the film cloudy in appearance and weaken the resistance of the film to chemical attacks.

Such a strict control of the humidity in the spraying atmosphere can be achieved by filling the spraying chamber with dried and dehumidified air and by using fully dehumidified air as the source of a compressed air for spraying of the solution. Also it is suitable to employ a so-called airless spraying technique or a nitrogen spraying method.

A glass plate to be coated is heated in advance so as to have a temperature above about 500° C. but below the softening temperature of the glass plate when the titanium compound solution is sprayed thereto. It is preferable to maintain the glass plate at a temperature in the range from about 550° C. to about 600° C. In the case of performing the coating method according to the invention immediately after formation of a glass plate from a molten glass, there will be no need of particularly heating the glass plate in preparation for the solution-spraying process.

The following examples are presented to illustrate the present invention.

EXAMPLE 1

In a spraying chamber filled with dried and dehumidified air, a solution consisting of 30% by volume of methylene chloride, 30% by volume of isopropyl alcohol and 40% by volume of titanium diisopropoxy-monooctyleneglycoxy acetylacetonate was sprayed onto a major surface of a 300 mm×300 mm wide and 6 mm thick plate of soda-lime glass produced by the float process and maintained at a temperature of 575° C. Using dehumidified and compressed air (3 kg/cm²), the spraying was continued for a period of 20 sec at a constant spraying rate of 1.5 ml/sec, whereby the glass surface was coated with a titanium oxide film. Four runs of this spraying process were carried out by minutely varying the absolute humidity of the spraying atmosphere (by controlling the extent of dehumidification of air) within the range from about 0.008 to about 0.005 kg $H_2O$/kg dry air, as shown in the following Table 1.

The coated glass plates obtained by the four runs of the process were practically identical in their reflecting and transmitting characteristics. The numerical values were as follows.

| Visible light reflection | 33% |
|---|---|
| Visible light transmission | 64% |
| Solar radiation reflection | 25% |
| Solar radiation transmission | 63% |

REFERENCE 1

For the sake of comparison, the coating process of Example 1 was repeated except that the absolute humidity of the spraying atmosphere was varied within the range from about 0.015 to about 0.009 kg $H_2O$/kg dry air, as shown in Table 1.

The reflecting and transmitting characteristics of the resultant titanium oxide-coated glass plates did not differ from those of the coated glass plates obtained in Example 1.

The coated glass plates obtained in Example 1 and Reference 1 were carefully observed by the naked eye to examine the appearance of the titanium oxide film and the degree of perceptibleness of tiny, opaque spots possibly existing in the film and also observed under a magnifying glass to count the number of such spots per unit area of the film. Then the coated glass plates were subjected to an acid resistance test and an alkali resistance test (using separate samples in the individual tests) to examine durability of the oxide film.

In the acid resistance test, the samples were immersed in 10% HCl solution maintained at 25° C. until the oxide film of each sample became damaged (judged to be damaged upon recognition of pinholes in the film or peeling of the film, even locally, from the glass plate).

In the alkali resistance test, the samples were immersed in 1 N NaOH solution maintained at 25° C. until the oxide film of each sample became damaged (judged to be damaged by the same criterions as in the acid resistance test).

The results of the observation and the resistance tests are presented in Table 1.

TABLE 1

| | Humidity of Spraying Atmosphere (kg $H_2O$/kg dry air) | Opaque Spots | | Acid Resistance | Alkali Resistance |
|---|---|---|---|---|---|
| | | Number per cm² | by Naked Eye | | |
| REFERENCE 1 | | | | | |
| Run 1 | 0.0149 | >300 | markedly perceptible | 2 days | 2 days |
| Run 2 | 0.0129 | 230 | perceptible | 8 days | 5 days |
| Run 3 | 0.0098 | 160 | perceptible | 13 days | 10 days |
| Run 4 | 0.0089 | 125 | barely perceptible | 27 days | 22 days |
| EXAMPLE 1 | | | | | |
| Run 1 | 0.0079 | 73 | not perceptible | >30 days | >30 days |
| Run 2 | 0.0069 | 51 | not perceptible | >30 days | >30 days |
| Run 3 | 0.0059 | 36 | not perceptible | >30 days | >30 days |
| Run 4 | 0.0049 | 20 | not | >30 days | >30 days |

TABLE 1-continued

| Humidity of Spraying Atmosphere (kg H₂O/kg dry air) | Opaque Spots | | Acid Resistance | Alkali Resistance |
|---|---|---|---|---|
| | Number per cm² | by Naked Eye | | |
| | | perceptible | | |

EXAMPLE 2

This example was identical with Example 1, except that the glass plate in every run of the solution-spraying process was maintained at a temperature of 600° C.

The reflecting and transmitting characteristics of the resultant coated glass plates were as follows.

| | |
|---|---|
| Visible light reflection | 34% |
| Visible light transmission | 63% |
| Solar radiation reflection | 26% |
| Solar radiation transmission | 62% |

REFERENCE 2

The coating process of Example 2 was repeated except that the absolute humidity of the spraying atmosphere was varied within the range from about 0.015 to about 0.009 kg H₂O/kg dry air.

The coated glass plates obtained in Example 2 and Reference 2 were subjected to the visual observation and the acid and alkali resistance tests described in connection with Example 1 and Reference 1. The results are presented in Table 2.

EXAMPLE 3

Used in this example was a solution consisting of 30% by volume of benzene, 30% by volume of methanol and 40% by volume of ethylacetoacetate titanium. This solution was sprayed onto the glass plate mentioned in Example 1 by the same method and under the same spraying conditions, including the glass plate temperature, as in Example 1.

The reflecting and transmitting characteristics of the resultant coated glass plates where as follows.

| | |
|---|---|
| Visible light reflection | 32% |
| Visible light transmission | 65% |
| Solar radiation reflection | 25.5% |
| Solar radiation transmission | 63.5% |

REFERENCE 3

The coating process of Example 3 was repeated except that the absolute humidity of the spraying atmosphere was varied within the range from about 0.015 to about 0.009 kg H₂O/kg dry air.

The coated glass plates obtained in Example 3 and Reference 3 were subjected to the visual observation and the acid and alkali resistance tests described hereinbefore. The results are presented in Table 3.

TABLE 2

| | Humidity of Spraying Atmosphere (kg H₂O/kg dry air) | Opaque Spots | | Acid Resistance | Alkali Resistance |
|---|---|---|---|---|---|
| | | Number per cm² | by Naked Eye | | |
| REFERENCE 2 | | | | | |
| Run 1 | 0.0149 | >300 | markedly perceptible | 3 days | 2 days |
| Run 2 | 0.0129 | 170 | perceptible | 10 days | 7 days |
| Run 3 | 0.0098 | 135 | barely perceptible | 27 days | 22 days |
| Run 4 | 0.0089 | 100 | barely perceptible | 30 days | 30 days |
| EXAMPLE 2 | | | | | |
| Run 1 | 0.0079 | 57 | not perceptible | >30 days | >30 days |
| Run 2 | 0.0069 | 40 | not perceptible | >30 days | >30 days |
| Run 3 | 0.0059 | 28 | not perceptible | >30 days | >30 days |
| Run 4 | 0.0049 | 12 | not perceptible | >30 days | >30 days |

TABLE 3

| | Humidity of Spraying Atmosphere (kg H₂O/kg dry air) | Opaque Spots | | Acid Resistance | Alkali Resistance |
|---|---|---|---|---|---|
| | | Number per cm² | by Naked Eye | | |
| REFERENCE 3 | | | | | |
| Run 1 | 0.0149 | 300 | markedly perceptible | 3 days | 2 days |
| Run 2 | 0.0129 | 200 | perceptible | 10 days | 6 days |
| Run 3 | 0.0098 | 170 | perceptible | 12 days | 10 days |
| Run 4 | 0.0089 | 114 | barely perceptible | 28 days | 25 days |

TABLE 3-continued

| | Humidity of Spraying Atmosphere (kg H₂O/kg dry air) | Opaque Spots Number per cm² | by Naked Eye | Acid Resistance | Alkali Resistance |
|---|---|---|---|---|---|
| EXAMPLE 3 | | | | | |
| Run 1 | 0.0079 | 67 | not perceptible | >30 days | >30 days |
| Run 2 | 0.0069 | 43 | not perceptible | >30 days | >30 days |
| Run 3 | 0.0059 | 21 | not perceptible | >30 days | >30 days |
| Run 4 | 0.0049 | 17 | not perceptible | >30 days | >30 days |

EXAMPLE 4

This example was generally similar to Examples 1 and 3. As a sole modification, a solution consisting of 50% by volume of benzene, 10% by volume of methanol and 40% by volume of triethanolamine titanium was sprayed in this example.

The reflecting and transmitting characteristics of the coated glass plates obtained in this example were as follows.

| | |
|---|---|
| Visible light reflection | 33% |
| Visible light transmission | 64% |
| Solar radiation reflection | 25% |
| Solar radiation transmission | 63% |

REFERENCE 4

The coating process of Example 4 was repeated except that the absolute humidity of the spraying atmosphere was varied within the same range as in References 1-3.

The results of the visual observation and the acid and alkali resistance tests on the coated glass plates obtained in Example 4 and Reference 4 are presented in Table 4.

What is claimed is:

1. In a method of coating a glass plate surface with a heat-reflecting metal oxide film, which comprises titanium oxide as a principal component thereof, through the step of spraying a solution containing a thermally decomposable organic titanium compound dissolved in an organic solvent onto a surface of a glass plate which has been heated such that said surface is maintained at a temperature sufficient to cause thermal decomposition of said organic titanium compound to titanium oxide,
   the improvement comprising the spraying step being performed by maintaining the absolute humidity of the spraying atmosphere, in which said glass plate is disposed, below about 0.008 kg H₂O/kg dry gas.

2. A method according to claim 1, wherein said temperature is in the range from about 550° C. to about 600° C.

3. A method according to claim 1, wherein said spraying atmosphere consists essentially of dry air and sprayed droplets of said solution.

4. A method according to claim 1, wherein said organic titanium compound is an alkyl titanate.

5. A method according to claim 1, wherein said organic titanium compound is a titanium acylate.

6. A method according to claim 1, wherein said organic titanium compound is a chelated titanium compound.

* * * * *

TABLE 4

| | Humidity of Spraying Atmosphere (kg H₂O/kg dry air) | Opaque Spots Number per cm² | by Naked Eye | Acid Resistance | Alkali Resistance |
|---|---|---|---|---|---|
| REFERENCE 4 | | | | | |
| Run 1 | 0.0149 | >300 | markedly perceptible | 2 days | 2 days |
| Run 2 | 0.0129 | 270 | perceptible | 6 days | 3 days |
| Run 3 | 0.0098 | 210 | perceptible | 10 days | 5 days |
| Run 4 | 0.0089 | 145 | barely perceptible | 20 days | 18 days |
| EXAMPLE 4 | | | | | |
| Run 1 | 0.0079 | 78 | not perceptible | >30 days | >30 days |
| Run 2 | 0.0069 | 66 | not perceptible | >30 days | >30 days |
| Run 3 | 0.0059 | 63 | not perceptible | >30 days | >30 days |
| Run 4 | 0.0049 | 51 | not perceptible | >30 days | >30 days | ns
UNITED STATES PATENT AND TRADEMARK OFFICE
CERTIFICATE OF CORRECTION

PATENT NO. : 4,323,598
DATED : April 6, 1982
INVENTOR(S) : Seiki OKINO et al

It is certified that error appears in the above-identified patent and that said Letters Patent are hereby corrected as shown below:

In a column of [73] Assignee, please delete "Nissan Motor Co., Ltd., Yokohama, Japan" and insert --Central Glass Company Limited, Ube City, Japan --.

Signed and Sealed this

Twenty-sixth Day of March 1985

[SEAL]

Attest:

DONALD J. QUIGG

Attesting Officer

Acting Commissioner of Patents and Trademarks